US008186314B2

(12) United States Patent
Brunelli et al.

(10) Patent No.: US 8,186,314 B2
(45) Date of Patent: May 29, 2012

(54) GENERATOR COOLING SYSTEM AND METHOD

(75) Inventors: Brian Todd Brunelli, Milwaukee, WI (US); Christopher Joseph Drew, West Allis, WI (US); George John Neary, West Allis, WI (US); John Richard Schneiker, Muskego, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 739 days.

(21) Appl. No.: 12/275,090

(22) Filed: Nov. 20, 2008

(65) Prior Publication Data

US 2009/0126658 A1 May 21, 2009

Related U.S. Application Data

(60) Provisional application No. 60/989,205, filed on Nov. 20, 2007.

(51) Int. Cl.
*F02B 63/00* (2006.01)
*F02B 63/04* (2006.01)
*H02K 7/18* (2006.01)
*F01P 1/00* (2006.01)

(52) U.S. Cl. .......................... 123/2; 123/41.56; 290/1 B

(58) Field of Classification Search .................. 123/2, 3, 123/198 E, 41.7; 290/1 B; 181/204
See application file for complete search history.

(56) References Cited

U.S. PATENT DOCUMENTS

| | | | | |
|---|---|---|---|---|
| 5,624,589 | A * | 4/1997 | Latvis et al. | 219/133 |
| 5,890,460 | A * | 4/1999 | Ball et al. | 123/41.7 |
| 5,899,174 | A * | 5/1999 | Anderson et al. | 123/2 |
| 5,908,011 | A * | 6/1999 | Stauffer et al. | 123/2 |
| 6,784,574 | B2 * | 8/2004 | Turner et al. | 310/58 |
| 6,979,912 | B2 * | 12/2005 | Mazuka et al. | 290/1 A |
| 7,049,707 | B2 * | 5/2006 | Wurtele | 290/1 B |
| 7,245,033 | B2 * | 7/2007 | Wurtele | 290/1 A |
| 7,291,932 | B2 * | 11/2007 | Wurtele et al. | 290/1 B |
| 7,717,094 | B2 * | 5/2010 | Yamamoto et al. | 123/519 |
| 2003/0075926 | A1 * | 4/2003 | Fukuda | 290/1 A |
| 2004/0004356 | A1 * | 1/2004 | Akimoto et al. | 290/1 B |
| 2005/0005601 | A1 * | 1/2005 | Piercey, III | 60/506 |
| 2008/0202447 | A1 * | 8/2008 | Kochi et al. | 123/2 |

* cited by examiner

*Primary Examiner* — Marguerite McMahon
*Assistant Examiner* — Tea Bajramovic
(74) *Attorney, Agent, or Firm* — Greenberg Traurig, LLP

(57) ABSTRACT

The invention provides to a cooling system and a method of cooling an engine-driven generator. The engine-driven generator includes an engine, a current generator, and a housing. The engine includes an engine air intake, and the current generator includes a generator air intake. The housing includes a first outlet, a second outlet, a first air passageway, and a second air passageway. The first air passageway is in communication with the second air passageway. The second air passageway partitions air into a first stream supplied to the engine air intake and a second stream supplied to the generator air intake. The first stream exits through the first outlet, and the second stream exits through the second outlet.

25 Claims, 7 Drawing Sheets

GENERATOR COOLING SYSTEM AND METHOD

BACKGROUND

Generators supply electrical power in remote locations where access to standard utility power is unavailable or in emergency situations when standard utility power to an area may be temporarily out of service. Generators include an engine and a current generator driven by the engine to produce power.

Portable generators are used on trucks at construction sites, in boats, and in recreational vehicles (RVs). The components of the generators are often positioned within a housing to protect the components from the environment. The housing is often located within an enclosed compartment on the truck, boat, or RV. Due to the enclosed space in which the generators are operated, it is important to remove heat during operation, particularly from the engine, the current generator, and other electrical devices.

Portable generators in RVs are usually enclosed within a compartment adjacent to a side panel of the RV. The space adjacent to the RV is often used as outdoor living space. If the side panel of the RV is used to exhaust air, it detracts from the ability to use this outdoor living space. As a result, it is desirable to intake and exhaust air from the generator without adversely altering the air near the RV. Also, the use of gas grills and campfires next to the RV may lead to the intake of already heated air into the generator, which leads to inefficient cooling of the generator.

SUMMARY OF THE INVENTION

Some embodiments of the invention provide a cooling system for an engine-driven generator. The cooling system includes an engine, a current generator connected to the engine, and a housing. The engine includes an engine air intake, and the current generator includes a generator air intake. The housing can enclose the engine and the current generator. The housing includes a first outlet, a second outlet, a first air passageway, and a second air passageway. The first air passageway is in communication with the second air passageway. The second air passageway partitions air into a first stream supplied to the engine air intake and a second stream supplied to the generator air intake. The first stream exits through the first outlet, and the second stream exits through the second outlet.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
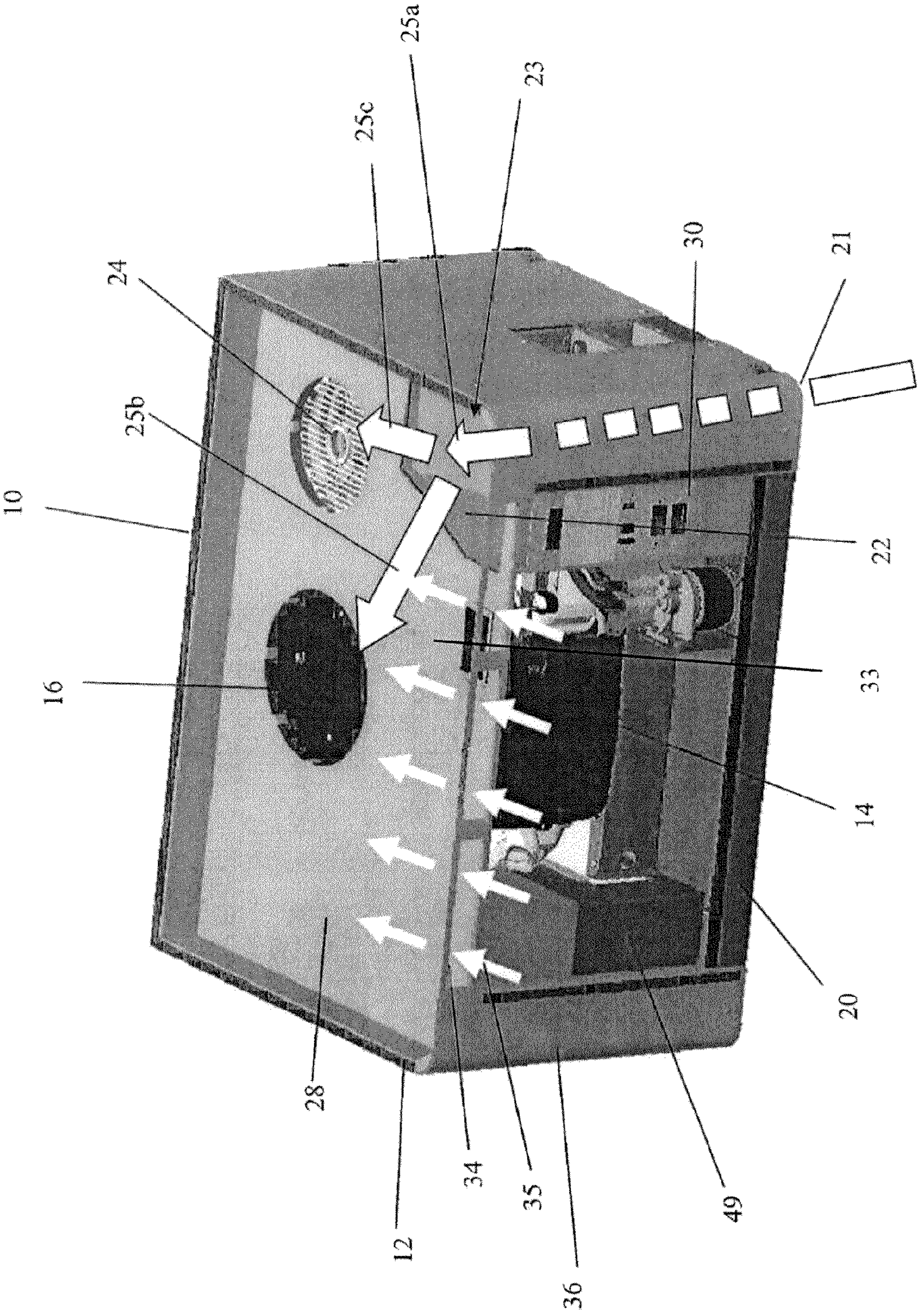
FIG. 1 is a front perspective view of an engine-driven generator according to one embodiment of the invention with a top wall removed.
Figure 2:
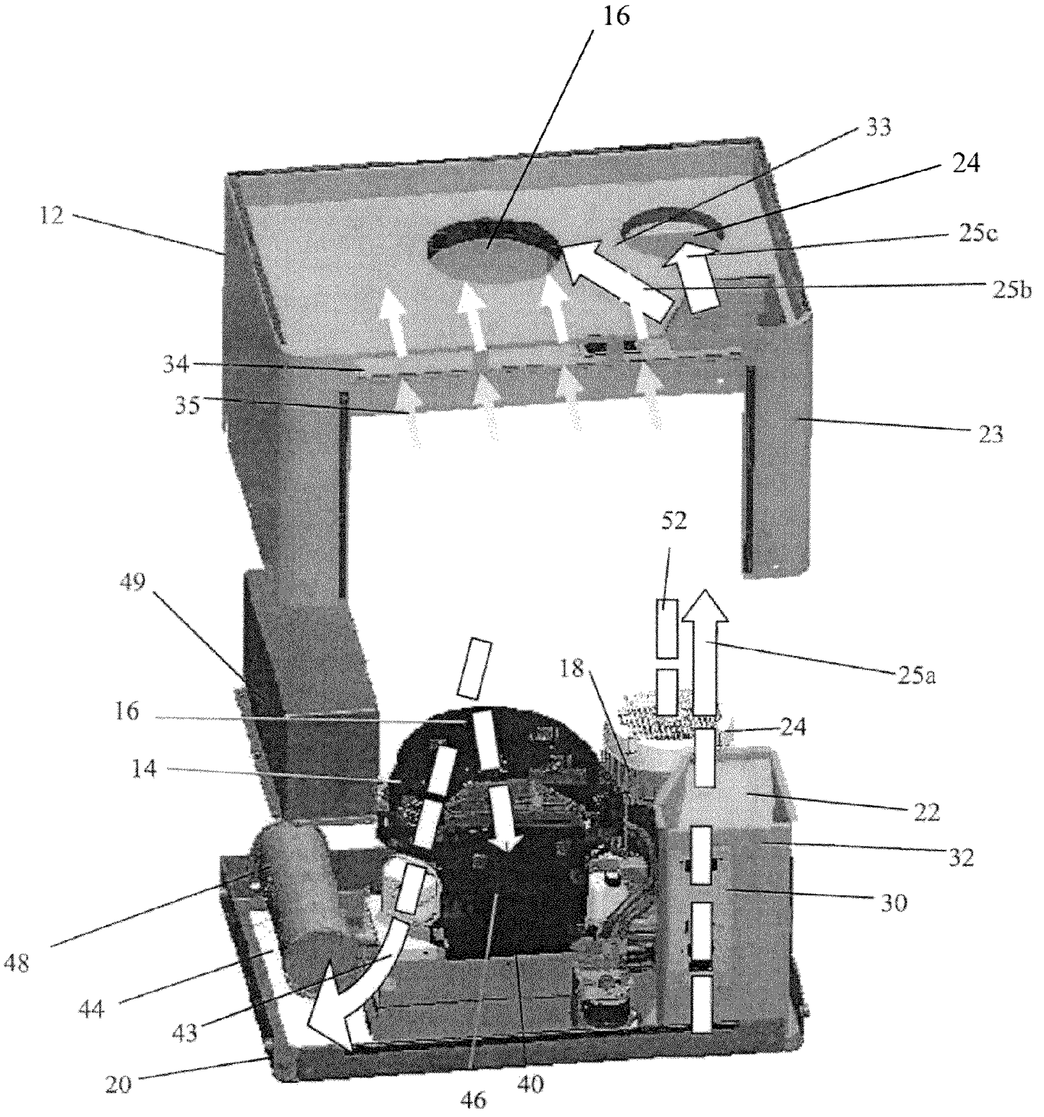
FIG. 2 is an exploded front perspective view of the engine-driven generator of FIG. 1 with the top wall removed.

FIGS. 1-10 illustrate an engine-driven generator 10 according to one embodiment of the invention. As shown in FIG. 1, the engine-driven generator 10 includes a housing 12, an engine 14, and an engine air intake 16. As shown in FIG. 2, the engine-driven generator 10 includes a current generator 18 and a generator air intake 24. The current generator 18 is connected to the engine 14. A fan (e.g., a flywheel fan driven by the crankshaft of the engine 14) can be positioned adjacent to the engine air intake 16.

Figure 3:
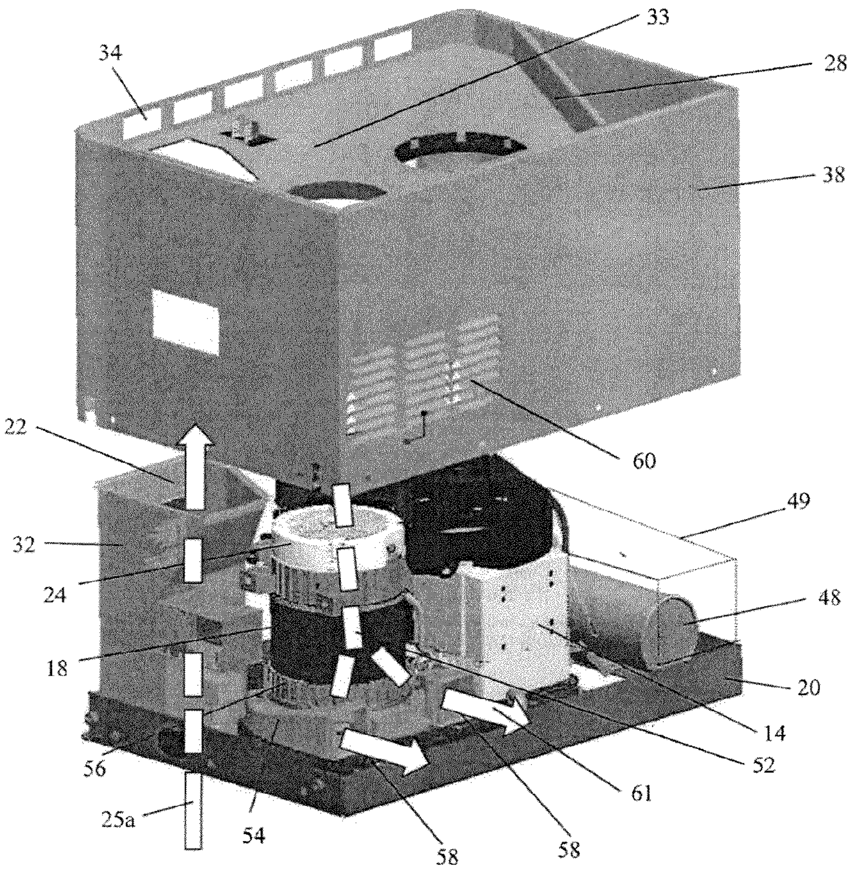
FIG. 3 is an exploded rear perspective view of the engine-driven generator of FIG. 1 with the top wall removed.
Figure 4:
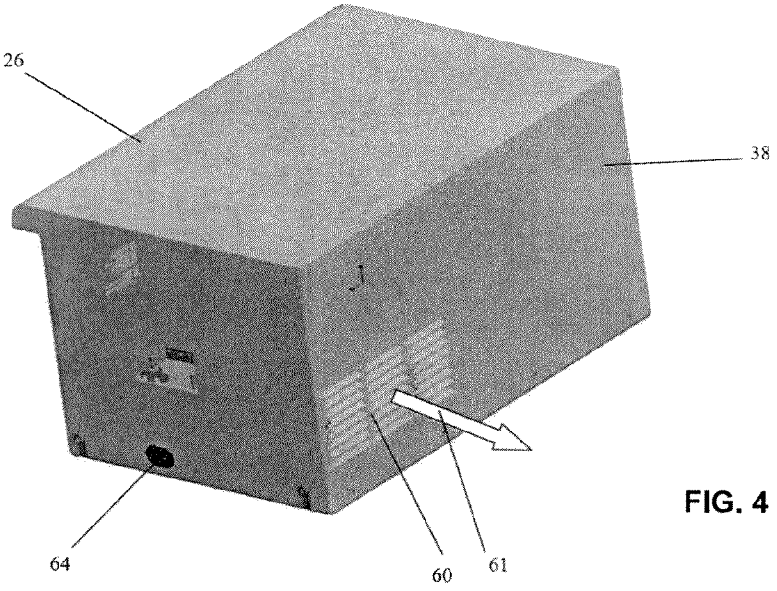
FIG. 4 is a rear perspective view of the engine-driven generator of FIG. 1 with the top wall in place.
Figure 7:
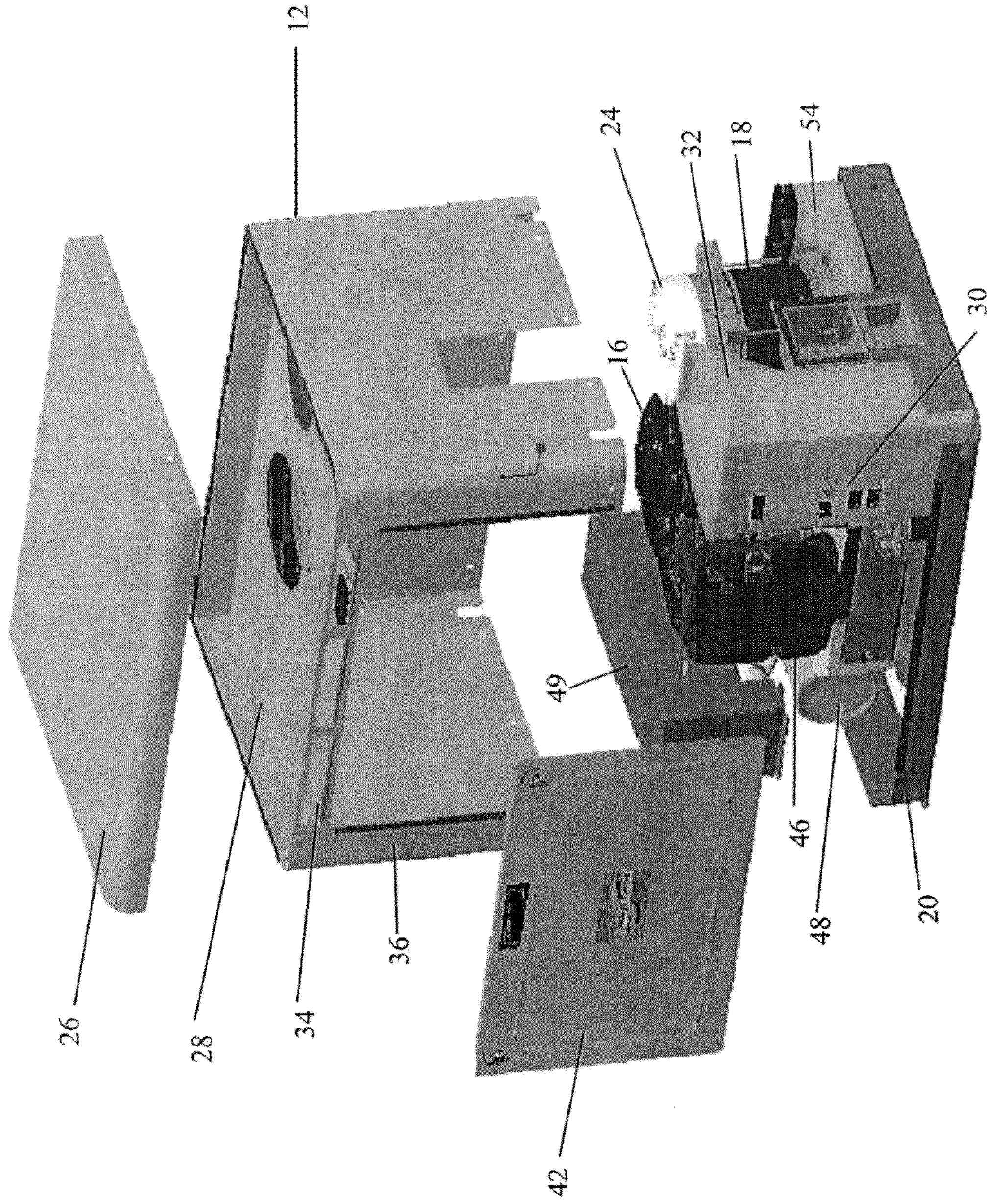
FIG. 7 is an exploded front perspective view of the engine-driven generator of FIG. 1 with the top wall in place.

The housing 12 can include a bottom wall 20, a top wall 26 (as shown in FIG. 7), a partition wall 28, a front wall 36, and a back wall 38 (as shown in FIGS. 3 and 4). The housing 12 can be configured to enclose the engine 14 and the current generator 18. The housing 12 can include a first air passageway 22 having an inlet 21 in the bottom wall 20 and an outlet 23 in communication with a second air passageway 33. The second air passageway 33 can partition air into a first stream supplied to the engine air intake 16 (as shown by arrow 25*b*) and into a second stream supplied to the generator air intake 24 (as shown by arrow 25*c*). The second air passageway 33 can intake external air (as shown by arrows 35) through apertures 34 before entering the engine air intake 16 and the generator air intake 24.

The engine 14 can be a diesel engine, a spark-ignition internal combustion engine, or another suitable type of engine. In one embodiment, the engine 14 and the current generator 18 can be connected in parallel by a belt and pulley system. Other embodiments can include a horizontal shaft engine that can be coupled directly to the current generator 18.

FIG. 1 illustrates the air flow through the engine-driven generator 10 according to one embodiment of the invention. Air (as shown by arrow 25*a*) can enter the first air passageway 22 through the inlet 21 and exit the first air passageway 22 through the outlet 23, which can be in communication with the second air passageway 33. The second air passageway 33 can be at least partially defined by the top wall 26 and the partition wall 28 of the housing 12. Some embodiments of the invention include channels or ducts to partition the air flowing to the engine intake 16 and/or the generator air intake 24.

Figure 6:
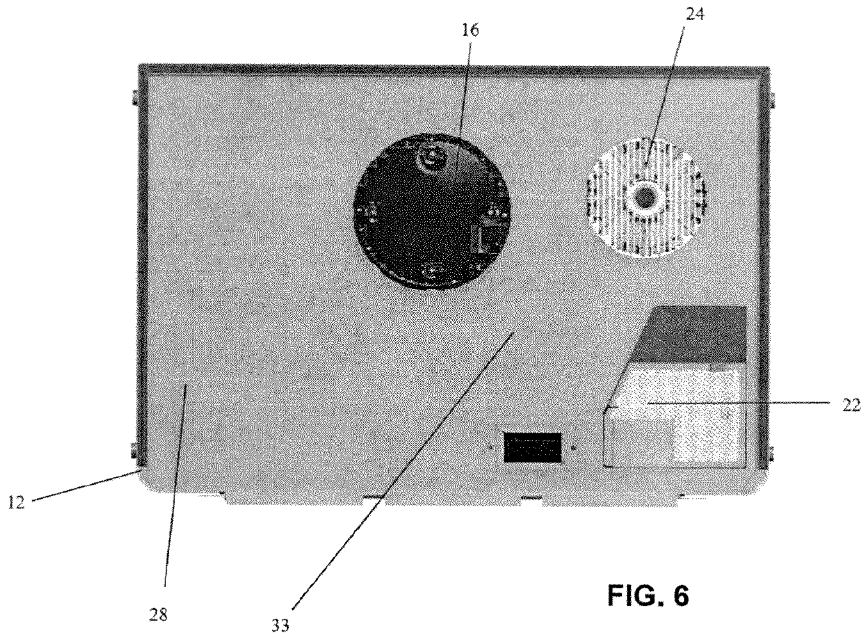
FIG. 6 is an internal top view of the an engine-driven generator of FIG. 1 with the top wall removed.

As shown in FIG. 1, a control panel 30 can include control switches, indicators, output receptacles, and other circuitry that generates heat. If overheated, the control panel 30 can shut down the engine-driven generator 10. It is necessary to keep the control panel 30 cool in order for the engine-driven generator 10 to remain running. As shown in FIG. 2, air (as shown by the arrow 25*a*) can pass adjacent to a control panel housing 32, to which the control panel 30 can be attached. The flow of air through the inlet 21 can cool the control panel 30 (as shown by the arrow 25*a*). As shown in FIGS. 1, 2, and 6, the first air passageway 22 can provide communication between the control panel housing 32 and the second air passageway 33.

FIGS. 1 and 2 illustrate that external air (as shown by the arrows 35) can enter the second air passageway 33 through one or more apertures 34. As shown in FIGS. 1 and 3, the apertures 34 can be positioned on the front wall 36 opposite to the back wall 38. As shown in FIGS. 3 and 4, the back wall 38 can include an exhaust outlet 60. As shown in FIG. 7, the front wall 36 can include a removable front panel 42.

Figure 8:
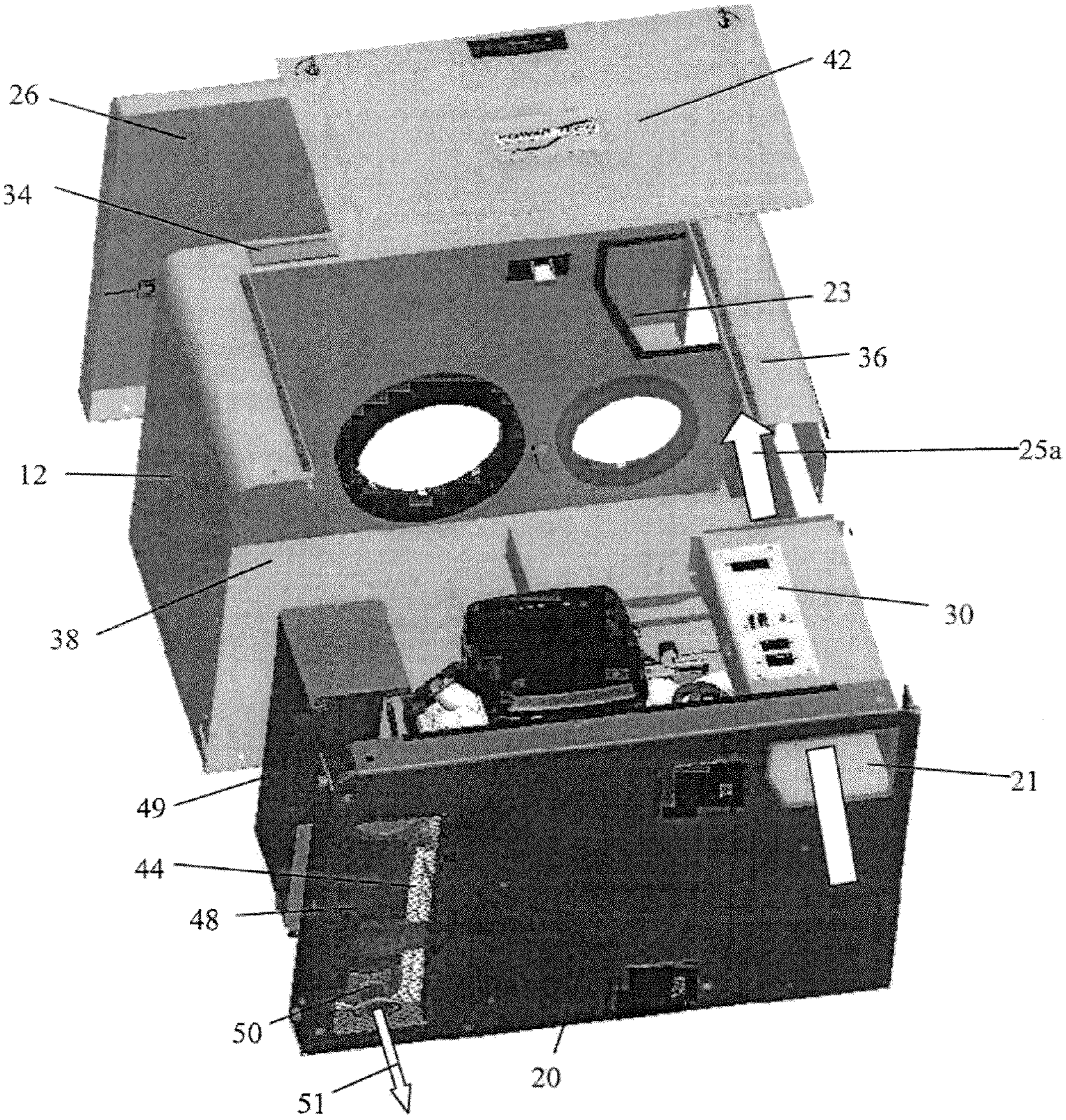
FIG. 8 is an exploded bottom perspective view of the engine-driven generator of FIG. 1 with the top wall in place.
Figure 9:
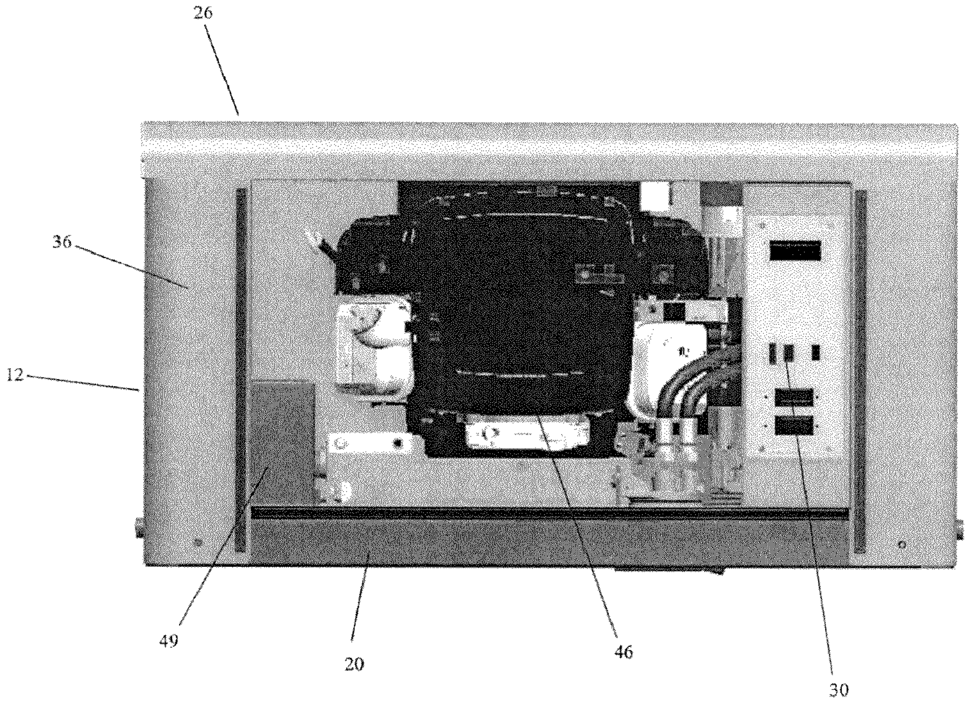
FIG. 9 is a front view of the engine-driven generator of FIG. 1 with the top wall in place but with a front panel removed.

FIG. 2 illustrates cooling air flow (as shown by arrow 43) from the engine air intake 16 across the engine 14. Air can exit the housing 12 through an aperture 44 in the bottom wall 20 of the housing 12. FIG. 2 also illustrates that a portion of the air (as shown by arrow 40) can be directed into an air filter 46 that filters air to be used in combustion by the engine 14. The exhaust gas created by the engine combustion can be directed away from the engine 14 through a muffler 48. The exhaust gas can exit the housing 12 (as shown by arrow 51 in FIG. 8) through a muffler exhaust outlet 50. The muffler exhaust outlet 50 can be a duct to exhaust gases from the muffler 48. The muffler exhaust outlet 50 can be positioned in the bottom wall 20 of the housing 12. In some embodiments, the muffler exhaust outlet 50 can be configured to exhaust gases outside both the housing 12 and an RV compartment (i.e., through a floor or a side wall of the RV). As shown in FIG. 8, the muffler exhaust outlet 50 can be positioned away from the inlet 21. The muffler 48 can be enclosed by a cover 49 (as shown in FIGS. 2 and 8) that can isolate the muffler 48 from other components of the engine-driven generator 10.

Figure 5:
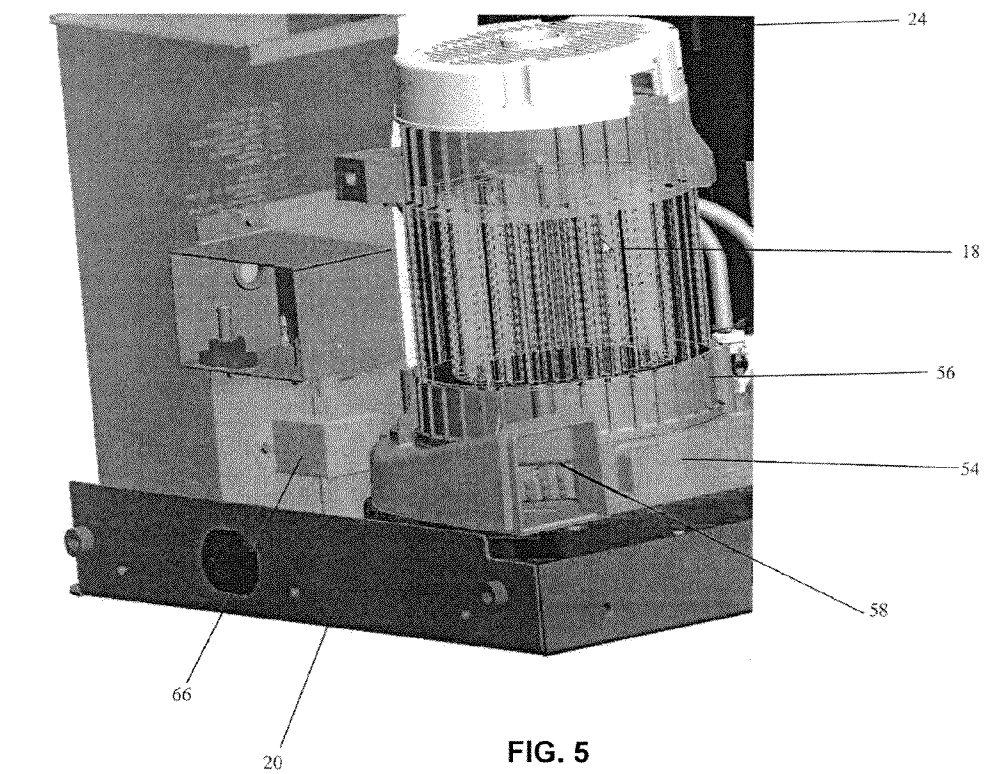
FIG. 5 is an internal perspective view of a current generator for use in the engine-driven generator of FIG. 1.

FIG. 3 illustrates cooling air flows (as shown by arrow 52) from the generator air intake 24 across the current generator 18. The current generator 18 can be an alternator, an inverter, a motor, etc. The cooling air flow (as shown by the arrow 52) that passes over the current generator 18 can be collected in a shroud 54 positioned adjacent to an end 56 of the current generator 18. The shroud 54 can be formed as a single piece with a lower bearing carrier, as shown in FIGS. 3 and 5, or it can be a separate component. The shroud 54 can direct air (as shown by arrow 61) to the exterior of the housing 12. The shroud 54 can include at least one outlet 58, and in some embodiments, the shroud 54 can include two outlets 58, as shown in FIG. 3. The air can be directed from the outlets 58 of the shroud 54 through the exhaust outlet 60 in a suitable side wall of the housing 12, such as the back wall 38 or another wall opposite to the inlet 21. The exhaust outlet 60 can be a vent or duct, through which air can exit the housing 12, as shown in FIGS. 3 and 4.

Figure 10:
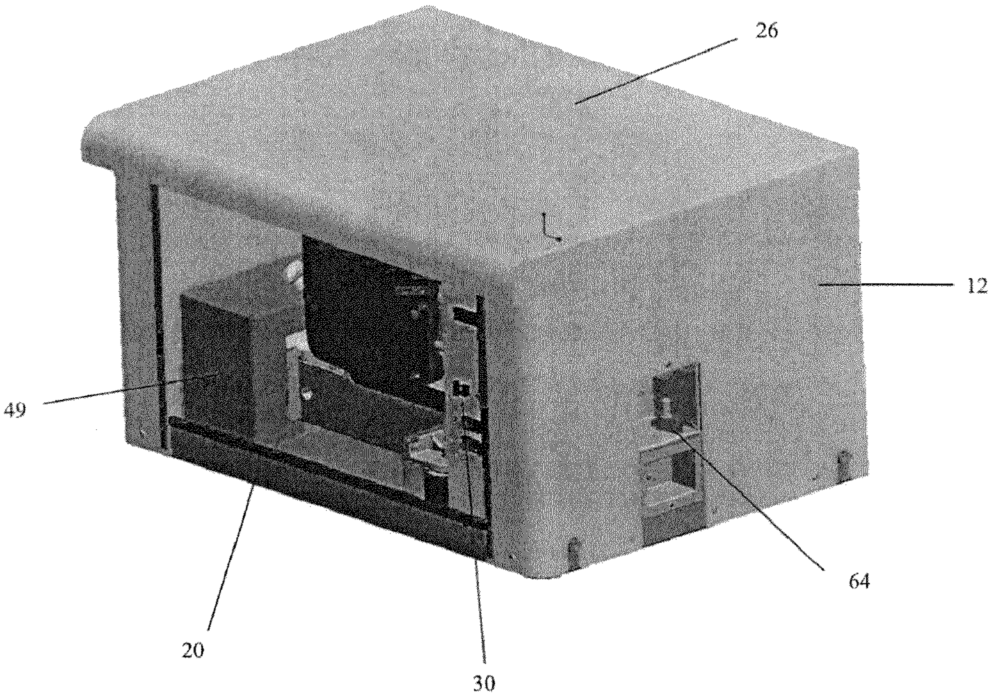
FIG. 10 is a front perspective view of the engine-driven generator of FIG. 1 with the top wall in place but with the front panel removed.

The engine-driven generator 10 can include a connection 64 (as shown in FIGS. 4 and 10) for an external fuel source (e.g., natural gas, liquid propane, or gasoline) and a fuel pump 66 (as shown in FIG. 5).

The invention can also provide a method of cooling the engine-driven generator 10 by directing air over the heat-generating components inside the housing 12. Air can enter the engine-driven generator 10 through the inlet 21 in the bottom wall 20 of the housing 12 and can be directed to the engine air intake 16 of the engine 14 and to the generator air intake 24 of the current generator 18. The current generator 18 can be positioned adjacent to the shroud 54, which can direct air past the current generator 18 and outside the housing 12.

The method can include intaking air through the first air passageway 22 and passing the air to the second air passageway 33 before at least a portion of the air (as shown by the arrow 43 in FIG. 2) can cool the engine 14. As shown in FIG. 1, the air (as shown by the arrow 25*a*) can pass adjacent to the control panel housing 32 so that the air can cool the control panel 30. The method can also include exhausting the air through the aperture 44 in the bottom wall 20 of the housing 12, as shown in FIG. 2. In some embodiments, the method further includes drawing in a second flow of air (as shown by the arrows 35 in FIGS. 1 and 2) into the second air passageway 33 through at least one aperture 34 in the front wall 36.

The method of cooling can further include communicating a second portion of the intake air (as shown by the arrow 25*c*) to the generator air intake 24. The air that passes across the current generator 18 (as shown by the arrow 52 in FIG. 3) can be collected in the shroud 54 positioned adjacent to the end 56 of the current generator 18. The air can be directed by the shroud outlet 58 outside the back wall 38 of the housing 12 through the exhaust outlet 60 (as shown by the arrow 61 in FIG. 3).

Various features and advantages of the invention are set forth in the following claims.

The invention claimed is:

1. An engine-driven generator comprising:

an engine;

an engine air intake;

a current generator connected to the engine;

a generator air intake; and a housing enclosing the engine and the current-generator, the housing including a first outlet, a second outlet, a first air passageway, an inlet, and a second air passageway, the inlet configured and arranged to receive air for cooling the engine and the current generator, the first passageway is configured and arranged to receive air from the inlet, the second air passageway is configured and arranged to receive air from the first air passageway and partition at least a portion of the air into a first stream supplied to the engine air intake for at least cooling the engine and a second stream supplied to the generator air intake for at least cooling the generator, the first stream exiting through the first outlet, and the second stream exiting through the second outlet.

2. The engine-driven generator of claim 1 wherein the housing includes a bottom wall and a back wall.

3. The engine-driven generator of claim 2 wherein the first outlet is positioned in the bottom wall of the housing.

4. The engine-driven generator of claim 2 wherein the second outlet is positioned in the back wall of the housing.

5. The engine-driven generator of claim 2, wherein the inlet is positioned in the bottom wall of the housing, the inlet being in communication with the first air passageway.

6. The engine-driven generator of claim 5 wherein the first outlet is positioned in the bottom wall of the housing and wherein the inlet is substantially opposite to of the first outlet.

7. The engine-driven generator of claim 5 wherein the inlet of the first air passageway is substantially opposite to the back wall.

8. The engine-driven generator of claim 1 wherein the first air passageway includes a control panel housing, and wherein the engine-driven generator includes a control panel attached to the control panel housing.

9. The engine-driven generator of claim 1 wherein the second air passageway includes an air conduit that is in fluid communication with the engine air intake.

10. The engine-driven generator of claim 1 wherein the second air passageway includes an air conduit in communication with the generator air intake.

11. The engine-driven generator of claim 1 and further comprising a shroud positioned adjacent to the current generator and directing the second stream toward the second outlet.

12. The engine-driven generator of claim 11 wherein the shroud is formed as a single piece with a lower bearing carrier of the current generator.

13. The engine-driven generator of claim 1 wherein the housing includes a top wall and a partition wall, the second air passageway being at least partially defined by the top wall and the partition wall.

14. The engine-driven generator of claim 2 wherein the back wall includes a muffler exhaust outlet configured to output exhaust gases from the engine.

15. The engine-driven generator of claim 2 wherein the bottom wall includes a muffler exhaust outlet configured to output exhaust gases from the engine.

16. The engine-driven generator of claim 2 wherein the first outlet is configured and arranged to allow the first stream and exhaust gases from the engine to exit the housing.

17. The engine-driven generator of claim 2 wherein the second outlet is configured and arranged to allow the second stream and exhaust gases from the engine to exit the housing.

18. The engine-driven generator of claim 1 and further comprising a fuel connector in communication with the engine.

19. The engine-driven generator of claim 1 wherein the engine comprises an air filter.

20. The engine-driven generator of claim 1 wherein the first stream is used in a combustion process of the engine.

21. A method of cooling an engine-driven generator, the engine-driven generator including an engine, a housing, and a current generator, the method comprising:

intaking air through a first air passageway via an inlet;

outputting air from the first air passageway to a second air passageway;

partitioning air flowing through the second air passageway into a first stream supplied to cool the engine and a second stream supplied to cool the generator;

outputting the first stream to a first outlet; and outputting the second stream to a second outlet.

22. The method of claim 21 and further comprising exhausting heated air through an aperture in a bottom wall of the housing.

23. The method of claim 21 and further comprising drawing a second flow of air into the second air passageway through an aperture in a side wall of the housing.

24. The method of claim 21 and further comprising collecting the second stream into a shroud positioned adjacent to an end of the current generator and directing air from the shroud to the second outlet.

25. The method of claim 21 wherein the engine-driven generator includes a control panel, and further comprising passing air from the first air passageway across the control panel.

* * * * *